United States Patent [19]
Kimura et al.

[11] Patent Number: 5,506,039
[45] Date of Patent: Apr. 9, 1996

[54] SHEET MOLDING COMPOUNDS, PRODUCTION PROCESSES THEREFOR, AND MOLDED MATERIALS THEREFROM

[75] Inventors: Yoshiro Kimura; Fumiyoshi Yamada, both of Izumiotsu; Kiyotaka Nakai, Chita, all of Japan

[73] Assignees: Dainippon Ink and Chemicals, Inc., Tokyo; Aisin Seiki Kabushiki Kaisha, Kariya, both of Japan

[21] Appl. No.: 227,589

[22] Filed: Apr. 14, 1994

Related U.S. Application Data

[63] Continuation of Ser. No. 967,539, Oct. 27, 1992, abandoned, which is a continuation of Ser. No. 696,294, Apr. 29, 1991, abandoned, which is a continuation of Ser. No. 319,754, Mar. 7, 1989, abandoned.

[30] Foreign Application Priority Data

Mar. 8, 1988 [JP] Japan .................................. 63-54055

[51] Int. Cl.⁶ .......................... B32B 7/02; B32B 5/16; B32B 3/26
[52] U.S. Cl. ...................... 428/218; 428/237; 428/240; 428/283; 428/313.3; 428/313.5; 428/318.6
[58] Field of Search .................... 428/285, 286, 428/218, 287, 283, 323, 325, 406, 237, 240, 313.3, 313.5, 318.6

[56] References Cited

U.S. PATENT DOCUMENTS

| | | | |
|---|---|---|---|
| 3,707,434 | 12/1972 | Stayner . | |
| 3,713,961 | 1/1973 | Copeland et al. . | |
| 4,013,810 | 3/1977 | Long | 428/308 |
| 4,025,686 | 5/1977 | Zion | 428/310 |
| 4,250,136 | 2/1981 | Rex | 264/257 |
| 4,323,623 | 4/1982 | Ahrens et al. | 428/246 |
| 4,339,490 | 7/1982 | Yoshioka et al. | 428/213 |
| 4,481,241 | 11/1984 | Kawashima et al. | 428/134 |
| 4,643,940 | 2/1987 | Shaw et al. | 428/308.4 |
| 4,900,629 | 2/1990 | Pitolaj | 428/422 |

FOREIGN PATENT DOCUMENTS 60-21219  2/1985  Japan .

*Primary Examiner*—James D. Withers
*Attorney, Agent, or Firm*—Oblon, Spivak, McClelland, Maier, & Neustadt

[57] ABSTRACT

Sheet molding compounds which comprising two layers, one being a sheet molding compound layer containing a hollow, lightweight filler particles (referred to as Type A layer) and the other being another type of sheet molding compound layer not containing lightweight, hollow filler particles (referred to as Type B layer), with the above-mentioned Type A and Type B layers making up a consistently integrated structure.

9 Claims, 2 Drawing Sheets

THE INTERFACES BETWEEN (A) LAYER AND (B) LAYER

HIGH-STRENGHT SMC LAYER (B)

LOW-SPECIFIC-GRAVITY SMC LAYER (A)

SHEET MOLDING COMPOUNDS, PRODUCTION PROCESSES THEREFOR, AND MOLDED MATERIALS THEREFROM

This application is a Continuation Ser. No. 07/967,539 filed on Oct. 27, 1992 now abandoned, which was a Continuation of Ser. No. 07/696,294, filed on Apr. 29, 1991, now abandoned, which was a Continuation of Ser. No. 07/319,754, filed on Mar. 7, 1989, also abandoned.

BACKGROUND OF THE INVENTION

1. Field of the Invention

The present invention relates to new sheet molding compounds (hereafter referred to as SMCs) with one side having the properties of a low-specific-gravity SMC and the other side having the properties of a high-strength SMC so as to serve for production of lightweight molded material, and further relates to processes for producing them, and also to lightweight, high-strength molded material of a sandwich structure which is produced by press-molding a combination of such SMCs.

2. Description of the Prior Art

As widely known, fiber-reinforced thermosetting plastics (hereafter referred to as FRP) have many advantages, including light weight, high strength and high corrosion resistance, over metals (iron in particular), and have been used for a variety of applications including bath tubs, sewage tanks, piped, boats, chairs, and various automobile components. There are many different processes for molding of FRP. One of the important processes is press molding, in which material for FRP is put in a press tool maintained at a required temperature, and then pressed and cured. Either liquid resin or molding material such as SMC is generally used as material for FRP. In particular, pressing of molding material is widely practiced to produce molded FRP because of various advantages including a smaller material loss, higher productivity and superior working environment as compared with other FRP molding processes.

Though having these good features, SMCs are lower in specific rigidity than light metals including aluminum and therefore, application of an SMC to interior and exterior automotive trims, including sunroof housing, designed to have a high rigidity would not be beneficial with respect to reduction in weight. To solve this problem, there have been efforts seeking to develop low-specific-gravity SMCs containing hollow, lightweight filler particles. However, though an increased content of hollow lightweight filler particles can decrease the specific weight, it may cause large deterioration in mechanical properties (flexural modulus in particular). Thus, SMCs comparable with aluminum in terms of specific rigidity have not been developed as yet. The above-mentioned low-specific-gravity SMCs can be improved in strength by using such SMC reinforcing material as carbon fiber or aramid fiber which are higher In tensile strength than glass fiber commonly used. It is difficult, however, for this process to produce practical SMCs at low cost. The present inventors have already invented and filed a patent application for molded material with increased specific rigidity which consists of a low-specific-gravity SMC layer sandwiched between two high-strength SMC layers, with the high-strength SMC layers serving to reinforce the low-specific-gravity SMC layer which is inferior in mechanical properties.

Later, the inventors made further studies seeking to improve the properties of the above-mentioned molded material, and identified some problems to be solved, including insufficient adhesion at the interfaces between the low-specific-gravity SMC layer and high-strength SMC layers, and increased thickness due to the multilayer structure.

SUMMARY OF THE INVENTION

In view of these points, the present inventors made further efforts and achieved the present invention after demonstrating that the above-mentioned problem is solved by press-molding a specific type of SMCs in which one side has the properties of a low-specific-gravity SMC while the other side has the properties of a high-strength SMC.

In one aspect, the present invention provides a sheet molding compounds (SMCs) with one side comprising a low-specific-gravity SMC layer (Type A layer) containing hollow, lightweight filler particles and the other side comprising a high-strength SMC layer (Type B layer) not containing hollow, lightweight filler particles, which are combined into a consistently integrated structure.

In another aspect, the present invention provides a SMC production processes in which a thermosetting resin layer containing hollow, lightweight filler particles is formed over a surface of a thermoplastic film while a layer comprising thermosetting resin and fiber reinforcement is formed over a surface of another thermoplastic film, followed by joining together the surfaces of the two thermoplastic films and achieving impregnation and thickening.

In a still another aspect, the present invention provides a lightweight, high-strength molded materials of a sandwich structure comprising two SMCs as described above which are press-molded after being combined by joining together their Type A surfaces (having the properties of a low-specific-gravity SMC) containing hollow, lightweight filler particles.

DETAILED DESCRIPTION OF THE INVENTION

Figure 1:
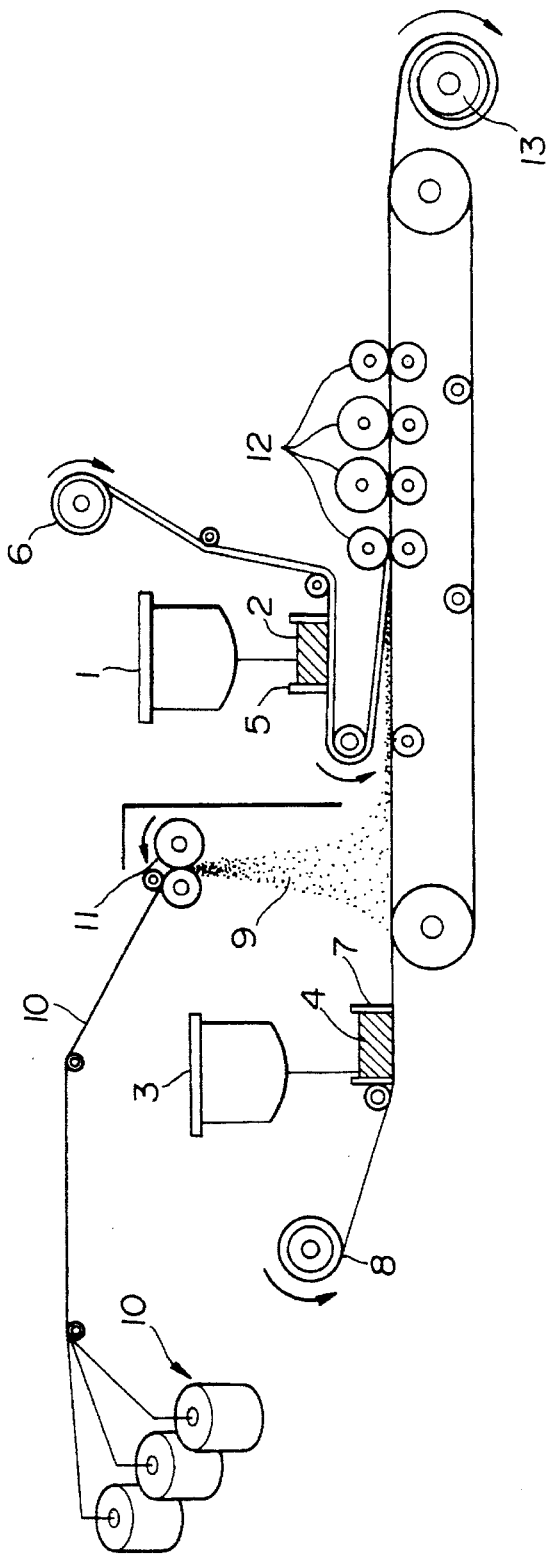
FIG. 1, which is intended to illustrate the SMC production processes as claimed as our invention, shows a schematic diagram of equipment for producing the SMCs as claimed as our invention.

The invention proposed in this application is described in more detail below.

Hollow, lightweight filler particles to be used for the SMCs as claimed as our invention should preferably be small, hollow particles of such materials as plastics and glass with a specific gravity in the range from 0.1 to 0.7. It is particularly desirable to use hollow, glass particles resistant to a pressure of 100 kg/cm$^2$ or more.

In the present invention, the hollow, lightweight filler particles may by used in combination with a reinforcing agent preferably in the form of flakes or fibers when it is intended to produce molded articles whose end or ends or terminals have a complicated contour such as those having a very thin end or a sharp end. The reinforcing agent may be used in a proportion of 1 to 50 parts by weight per 100 parts by weight of the hollow, lightweight filler particle. The reinforcing agent may preferably be fibers of 0.05 to 6 mm in length.

A Type A SMC layer should preferably contain 15 percent by volume or more, more desirably in the range from 20 to 50 percent by volume, of such material as stated above, in addition to thermosetting resin and such fiber reinforcement as glass fiber, preferably in the from of chopped glass strands. The thermosetting resin may be, for instance, epoxy resin, unsaturated polyester resin, an vinyl ester resin, and should preferably be unsaturated polyester resin or vinyl ester resin.

The chopped glass strands as stated above should preferably be produced by a process in which strands of about 50–100 glass filaments with a 5–30 um diameter are cut to pieces with a length of ⅛ to 4 inches, desirably with a fiber length in the range from ½ to 2 inches. The fiber strand content should preferably in the range from 5 to 40 percent by volume.

The content of thermosetting resin should preferably be in the range from 10 to 80 percent by volume. The thermosetting resin may contain catalysts, internal mold releasing agents, pigments, low profile additives, flame retardants, thickeners, fillers, and other generally known additives.

A Type B SMC layer consists of fiber reinforcement and thermosetting resin which does not contain such lightweight filler particles as above. The thermosetting resin used in the Type B layer should preferably be the same as the resin used in the above-mentioned Type A layer to ensure effective integration. The use of different resins may be permitted as long as it does not prevent the formation of a satisfactory integrated structure. The fiber reinforcement should be of glass fiber, preferably in the form of chopped strands as stated above. Its content should preferably be 30 percent by volume or more, more desirably in the range from 35 to 55 percent by volume. A content of less than 30 percent by volume will not permit the formation of molded material having a surface layer with a sufficient strength.

A mixture of two or more materials may be used as the fiber reinforcement for the Type A and/or Type B SMC layers.

The SMCs as claimed as our invention may be produced by using generally known SMC production equipment. A production process is illustrated below with reference to drawings. FIG. 1 schematically shows typical SMC production equipment. For the purposes of the invention, the resin paste (2), which is made up of unsaturated polyester resin and/or vinyl ester resin containing hollow light-weight filler particles, is prepared in the resin tank (1) while the resin paste (4), which is made up of unsaturated polyester resin and/or vinyl ester resin, is prepared in the resin tank (3). Each of the resin pastes, (2) and (4), may also contain catalysts, internal mold releasing agents, pigments, low profile additives, flame retardants, thickeners, fillers, flake-like or fibrous reinforcing materials, and other generally known additives, as required. The resin paste (2) supplied from the resin tank (1) is spread by the doctor knife (5) over a surface of the thermoplastic film (6) (polyethylene film, for example) to form a resin layer, while the resin paste (4) supplied from the resin tank (2) is spread by the doctor knife (7) over a surface of the thermoplastic film (8) (polyethylene film, for example), onto which the chopped strands (9) produced by cutting the roving (10) with the roving cutter 811) are scattered to provide a layer of a mixture of the resin (4) and the chopped strands (9) over the surface of the film (8). Then, these thermoplastic resin films, (6) and (8), are combined by joining together the two coated surfaces, and impregnation is achieved between the defoaming/impregnation rolls (12). The resultant sheet is wound on the wind-up roll (13), followed by thickening to provide a SMC as claimed as our invention.

A SMC as claimed as our invention may also be produced by preparing the resin paste (4) in the resin tank (1) while preparing the resin paste (2) in the resin tank (3), with the other operations being performed in the same way as above.

Figure 2:
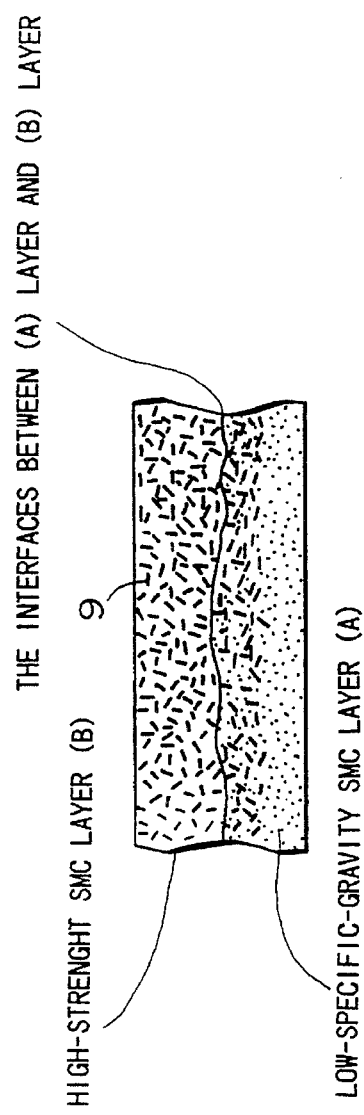
FIG. 2 shows a cross section of part of a SMC as claimed as our invention.

FIG. 2 schematically shows a cross section of a SMC as claimed as our invention. The feed rate of the resin pastes (2) and (4) may be varied properly by controlling the above-mentioned doctor knifes (5) and (7) to achieve a desired composition (ratio of layer thickness) of the interface comprising a layer having the properties of a low-specific-gravity SMC and a layer having the properties of a high-strength SMC.

In the above description, a layer of a mixture of resin and fiber reinforcement is formed over the thermoplastic film (8) by spreading the resin paste (4) with the doctor knife (7) over the film (8) followed by scattering over it chopped strands (9) produced by cutting the roving (10) with the roving cutter (11). This is not the only process that is claimed as our invention. Other effective processes include the following:

(a) Chopped strands (fiber reinforcement) are first spread over the film surface which is then coated and impregnated uniformly with liquid resin by such a method ad curtain coating, shower coating, or spraying to allow a layer of a mixture of resin and fiber reinforcement to be produced over the film.

(b) Chopped strands (fiber reinforcement) and liquid resin are supplied onto the film surface while being stirred at the same time, and then the film is passed between rolls to allow a uniform film of a mixture of resin and fiber reinforcement to be produced over the film.

(c) Glass fiber sheet material (fiber reinforcement) is passed through a resin paste tank to impregnate the sheet material with the resin, and the resin-impregnated sheet material is then put in layers over the film surface to allow a layer of mixture of resin and fiber reinforcement (resin-impregnated sheet material) to be formed over the film.

Figure 3:
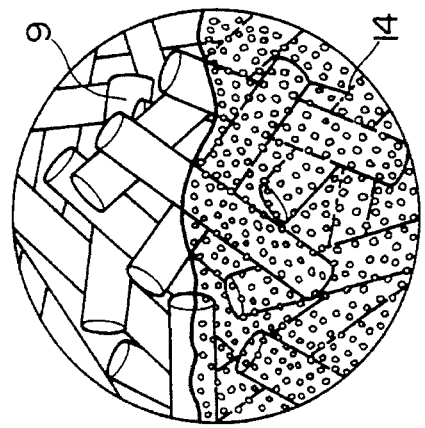
FIG. 3 illustrates an enlarged cross section of part of the interface of a SMC as claimed as our invention.

FIG. 3 illustrates an enlarged cross section of the interface between the Type A layer and Type B layer in a SMC as claimed as our invention. The zone where the two resin paste impregnants are in equilibrium through the intermediate of the chopped glass strands (9), that is, the interface between the low-specific-gravity type A SMC layer and the high-strength Type B SMC layer, shares the same chopped glass strands (9) in common, demonstrating a high degree of interation.

Figure 4:
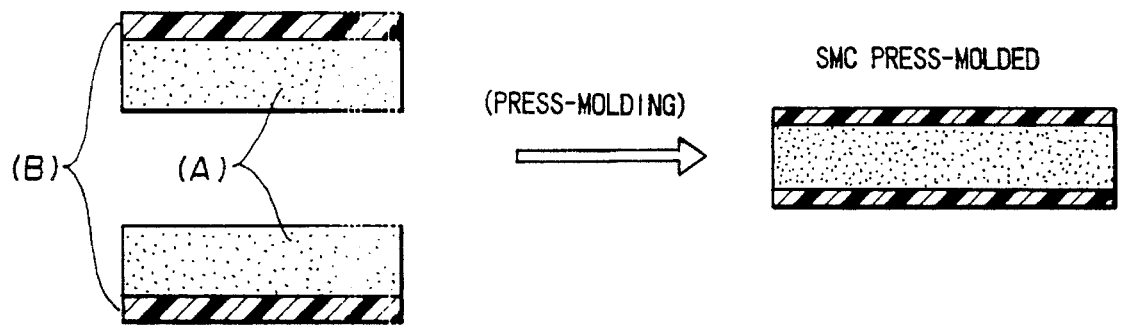
FIG. 4 illustrates a process for producing a molded plate comprising a SMC as claimed as our invention, and the structure of the plate.

Described below is lightweight, high-strength molded material of a sandwich structure which is produced by press-molding SMCs as claimed as our invention. As illustrated in FIG. 4, lightweight, high-strength molded material of a sandwich structure can be produced by for instance, press-molding two SMCs as stated above after combining them by joining together their Type A layers (having the properties of low-specific-gravity SMC), which contain hollow lightweight filler particles. Molded material thus obtained is made up of a SMC containing a consistently integrated interface between a low-specific-gravity SMC layer and a high-strength SMC layer. This structure can prevent the separation between the low-specific-gravity SMC layer and the high-strength SMC layer at the interface, which represents the major defects of conventional molded materials comprising a low-specific-gravity SMC layer sandwiched between two high-strength SMC layers. Furthermore, thin molded plates with a thickness of 2 mm or less can be produced easily. The effective press molding conditions for these SMCs are, like those for conventional SMCs, a temperature of 40°–180° C., pressure of 10–200 kg/cm², and pressing time of 1–60 minutes. Any desire set of conditions may be used taking into account such properties as the composition of the SMC used and the target form of the molded product to be produced.

The SMCs of the present invention are characterized by greatly increased adhesion at the interface between the low-specific-gravity SMC later and the high-strength SMC layer as compared with conventional SMCs. Molded plates made from the SMCs can be as thin as 2 mm or less, higher in specific rigidity and moldability than aluminum, and useful for a variety of applications including interior and exterior automotive trims, housing panels, other housing materials, industrial parts, leasure equipment, and electronic and electric parts.

PRACTICAL EXAMPLE

The invention will be more clearly understood with reference to the following practical examples.

PRACTICAL EXAMPLE 1

As illustrated in FIG. 1, the resin past (A) (Table 1) was prepared in the resin tank (1) while the resin paste (C) (Table 1) was prepared in the resin tank (4). The resin paste (A) supplied from the resin tank (1) was spread with the doctor knife (5) over the surface of the polyethylene film (6) at the feed rate of 1,100 g/m². The resin paste (C) supplied from the resin tank (3) was spread with the doctor knife (7) over the surface of the polyethylene film (8) at the feed rate of 400 g/m², and the chopped glass strands (9) with a 1-inch length (Japan Glass Fiber Co., Ltd., RER4630-SM18 glass roving) were scattered over it at the feed rate of 1,500 g/m². Then, the above two polyethylene films 86) and 88) were combined by joining together the coated surfaces. After the completion of defoaming and impregnation, they were wound up on a roll and thickened at 40°–50° C. for 24 hours to form a 3,000 g/m² SMC sheet in which the polyethylene film (6) side had the properties of a low-specific-gravity SMC while the polyethylene film (8) side had the properties of a high-strength SMC.

Next, the resultant SMC sheet was cut into squares with a size of 190 mm×190 mm. Two of them were combined by joining together the sides having the properties of a low-specific-gravity SMC, placed in a 300 mm×3400 mm plate mold, and press-molded under the conditions of a temperature of 140° C., pressure of 70 tons and pressing time of 3 minutes to provide a molded plate with a thickness of 1.9 mm. Each side of the molded plate had a complete, blue-colored surface with the properties of a high-strength SMC. No defects including blisters were detected in its appearance.

PRACTICAL EXAMPLE 2

A 2,500 g/m² SMC sheet was produced by carrying out the same operations as in practical Example 1 above except that the resin paste (B) (Table 1), instead of the resin paste (A), was prepared in the resin tank (1) and that the chopped glass strands of 1-inch length (9) was scattered at a feed rate of 1,000 g/m².

The resultant SMC sheet was cut into squares with a size of 220cm×220 cm. Press molding was performed in the same way as in Practical Example 1 to provide a molded plate with a thickness of 2.0 mm. Again, each side of the molded plate had a complete, blue-colored surface with the properties of a high-strength SMC. No defects including blisters were defected in its appearance.

PRACTICAL EXAMPLE 3

Figure 5:
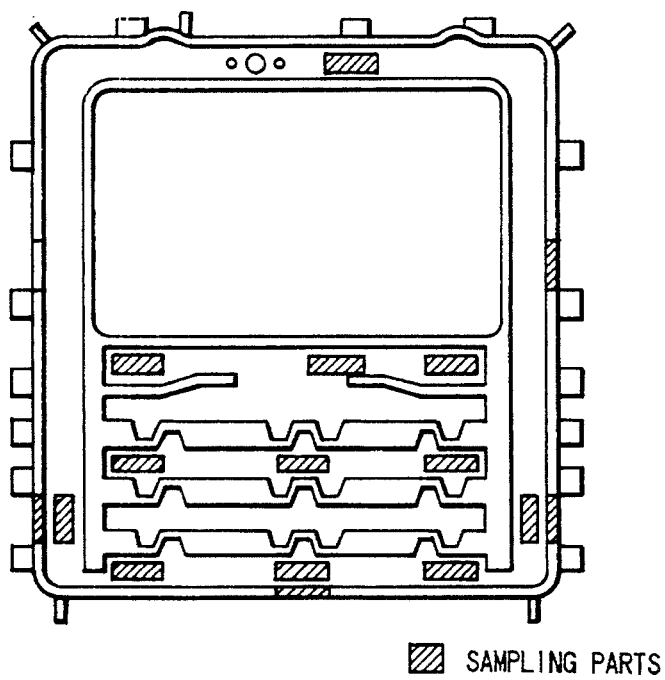
FIG. 5 shows a plan of a sunroof housing produced from a SMC as claimed as our invention.

The SMC produced in Practical Example 1 was cut into sheets with a standard size of 920 mm×490 mm. A molded sunroof housing (typical thickness 3 mm) for automobile shown in FIG. 5 was produced from two of the sheets which had been combined by joining together their Type A sides having the properties of a low-specific-gravity SMC. A sunroof housing is a base component used for mounting mechanical components of the sunroof of an automobile, and is required to be light in weight and high in rigidity. The molding conditions used here were mold temperature of 146° C. (upper part) and 142° C. (lower part), pressure of 450 tons, pressing time of 3 minutes and charge of 4.5 kg. The molded product including a steel insert of 1.6 kg was 5.6 kg in total weight. This weight is much smaller than the 7.1 kg for a conventional SMC (specific gravity 1.8) and is comparable to a product made of a low-specific-gravity SMC (specific gravity 1.33). Each side of the molded sunroof housing had a nearly complete, blue-colored surface with the properties of a high-strength SMC. No defects including blisters were detected in its appearance.

PRACTICAL EXAMPLE 4

In the SMC production equipment illustrated in FIG. 1, the resin past (D) (Table 1) was prepared in the resin tank (1) while the resin paste (E) (Table 1) was prepared in the resin tank (3). The resin paste (D) supplied from the resin tank (1) was spread with the doctor knife (5) over the surface of the polyethylene film (6) at a feed rate of 1,250 g/m². The resin paste (E) supplied from the resin tank (3) was spread over the surface of the polyethylene film (8) at a feed rate of 1,000 g/m² and the chopped glass strands (9) with a 1-inch length (Japan Glass Fiber Co., Ltd. RER4630-SM18 glass roving) were scattered over it at a feed rate of 750 g/m². Then, the above two polyethylene films (6) and (8) were combined by joining together the coated surfaces. After the completion of defoaming and impregnation, they were wound up on a roll and thickened at 40°–50° C. for 24 hours to produce a 3,000 g/m² SMC sheet in which the polyethylene film (6) side had the properties of a low-specific-gravity SMC while the polyethylene film (8) side had the properties of a high-strength SMC.

Next, press molding was performed in the same way as in Practical Example i to produce a molded plate with a thickness of 2.0 mm. Each side of the molded plate had a complete, blue-colored surface with the properties of a high-strength SMC. No defects including blisters were detected in its appearance. The product had an excellent external appearance because of extremely small warp (deformation).

[TABLE 1-1]

| | | Resin Paste Formulation | | | | |
|---|---|---|---|---|---|---|
| | Formulation Ingredient | Resin Paste A | Resin Paste B | Resin Paste C | Resin Paste D | Resin Paste E |
| Unsaturated Polyester Resin | POLYLITE ® PS-260 DAINIPPON INK AND CHEMICALS INCORPORATED. | 100 parts by weight | 100 parts by weight | 100 parts by weight | | |
| Unsaturated Polyester Resin | POLYLITE ® PS-260 DAINIPPON INK AND CHEMICALS INCORPORATED. | | | | 60 parts by weight | 60 parts by weight |
| Low Profile Additive | LP-40A UNION CARBIDE CORPORATION | | | | 40 parts by weight | 40 parts by weight |
| Lightweight filler | Glass Bubbles ® B37/2000 SUMITOMO 3M Ltd. | 37 pats by weight (53.7 vol. %) | 10 parts by weight (23.9 vol. %) | | 40 parts by weight (51.3 vol. %) | |
| Filler | Calcium Carbonate NS-200 NITTO FUNKA KOCYO K. K. | | | | 30 parts by weight | 200 parts by weight |
| Pigment | POLYTON ® Blue-PC-3322 DAINIPPON INK AND CHEMICALS INCORPORATED. | | | 3 parts by weight | | 5 parts by weight |
| Internal Mold Release agent | Zinc Stearate DAINIPPON INK AND CHEMICALS INCORPORATED. | | | 3 parts by weight | | 4 parts by weight |
| Catalyst | t-butyl peroxy benzoate KAYAKU NOURY CORPORATION | 1.2 parts by weight | 1.2 parts by weight | 1.2 parts by weight | 1.2 parts by weight | 1.2 parts by weight |
| Thickening Agent | KYOWAMAG ®-40 KYOWA CHEMICAL INDUSTRY COMPANY Ltd. | 2.5 parts by weight | 2.5 parts by weight | 2 parts by weight | 2.5 parts by weight | 1.5 parts by weight |
| Other Additive | RP-84 DAINIPPON INK AND CHEMICALS INCORPORATED. | 0.2 parts by weight | 0.2 parts by weight | 0.2 parts by weight | | |

[TABLE 2]

Characteristics of SMC Used in Comparative Example

| | Characteristics of Sheet | | Characteristics of Molded Plate | | |
|---|---|---|---|---|---|
| | unit weight | appearance | flexural strength | flexural modulus | specific gravity |
| RMC-340 | 3000 g/m² | gray | 34.0 kg/mm² | 1600 kg/mm² | 1.80 |
| DICMAT-5802 | 1600 g/m² | white | 14.5 kg/mm² | 860 kg/mm² | 1.33 |

[TABLE 3-1]

Characteristics of Molded Material

| | | Aluminum | Molded Plate | | | | |
|---|---|---|---|---|---|---|---|
| | | | Practical Example 1 | Practical Example 2 | Practical Example 4 | Comparative Example 1 | Comparative Example 3 |
| | Thickness (mm) | | 1.9 | 2.0 | 2.0 | 3.2 | 1.9 |
| ($\rho$) | Specific Gravity | 2.7 | 1.29 | 1.35 | 1.30 | 1.55 | 1.64 |
| ($\sigma$) | Flexural strenght (kg/mm²) | 20 | 27.0 | 20.2 | 18.4 | 27.5 | 20.4 |
| ($\epsilon$) | Flexural modulus (kg/mm²) | 7200 | 1430 | 1160 | 1050 | 1440 | 1400 |
| | Specific strenght ($\sqrt{\sigma}/\rho$) | 1.66 | 4.03 | 3.33 | 3.30 | 3.38 | 2.75 |
| | Specific modulus ($\sqrt[3]{\epsilon}/\rho$) | 7.15 | 8.73 | 7.78 | 7.82 | 7.29 | 6.82 |
| | Moldability* | — | ○ | ○ | ○ | x | x |
| | Lightness** | 100 | 81.9 | 91.9 | 91.4 | 98.1 | 104.8 |

| | | | Molded sunroof Housing | | |
|---|---|---|---|---|---|
| | | Aluminum | Practical Example 3 | Comparative Example 2 | Conventional SMC |
| | Thickness (mm) | | 3.0 | 3.0 | 3.0 |
| ($\rho$) | Specific Gravity | 2.7 | 1.32 | 1.33 | 1.80 |
| ($\sigma$) | Flexural strenght (kg/mm²) | 20 | 23.7 | 13.0 | 16.5 |

[TABLE 3-1]-continued

| | Characteristics of Molded Material | | | | |
|---|---|---|---|---|---|
| ($\epsilon$) | Flexural modulus (kg/mm$^2$) | 7200 | 1280 | 680 | 820 |
| | Specific strenght ($\sqrt{\sigma}/\rho$) | 1.66 | 3.69 | 2.71 | 2.26 |
| | Specific modulus ($\sqrt[3]{\epsilon}/\rho$) | 7.15 | 8.23 | 6.61 | 5.20 |
| | Moldability* | — | ○ | x | x |
| | Lightness** | 100 | 86.9 | 108.2 | 137.5 |

**Lightness: Percent weight of molded material relative to 100 for aluminum having the same flexural rigidity
*Moldability ratings
○: no blister detected
x: blister or chack/chip detected

COMPARATIVE EXAMPLE 1

The Dainippon Ink and Chemicals RMC-340 high-strength SMC and the Dainippon Ink and Chemicals DIC-MAT-5802 low-specific-gravity SMC were cut into sheets with a size of 190 mm× 190 mm, from which a molded plate with a total thickness of 3.2 mm comprising four DICMAT-5802 sheets sandwiched between two RMC-340 sheets were produced under the same press-molding conditions as used in Practical Example 1 above. The white color of DICMAT-5802 was seen along the periphery of the molded plate while the gray color of RMC-340 occupied only about 80 percent of the both surfaces of the molded plate. In addition, three blisters, each about the size of a of 23 mm diameter coin, were detected on the molded plate.

COMPARATIVE EXAMPLE 2

The DICMAT-5892 low-specific-gravity SMC was cut into sheets with a size of 920mm×490 mm, from which a molded automobile sunroof housing was produced by the same procedure as used in Practical Example 3 above. The molded product including a 1.6 kg steel insert was 5.6 kg in total weight.

Test pieces with a size of 25 mm×60 mm were sampled from the molded products produced in Practical Examples 1,2 and 3 and comparative Examples 1 and 2. They were taken from the central portion, excluding the peripheral 50 mm zone, of the molded plates, or from the portion of the sunroof housings specified in FIG. 5. Measurements were made of their flexural strength, flexural modulus (in accordance with JIS K-7203), and specific gravity (in accordance with JIS K-7112). Results are shown in Table 3.

COMPARATIVE EXAMPLE 3

The Dainippon Ink and Chemicals RMC-340 high-strength SMC and the Dainippon Ink and Chemicals DIG-MAT-5802 low-specific-gravity SMC were cut into sheets with a size of 190 mm× 190 mm, from which a molded plate with a total thickness of 1.9 mm comprising two DICMAT-5802 sheets sandwiched between two RMC-340 sheets were produced under the same press-molding conditions as used in Practical Example 1 above. The white color of DICMAT-5802 was seen along the periphery of the molded plate while the gray-colored RMC-340 occupied only about 70 percent of the both surfaces of the molded plate. In addition, five blisters, each about the size of a coin of 23 mm diameter, were detected on the molded plate.

The present Comparative Example 3 was designed to provide a plate having the same thickness as the plate produced in Practical Example 1 above, it is evident from Table 3 that the plate produced in Practical Example 1 was smaller in weight though slightly higher in strength. The molded SMCs as claimed as our invention are higher in specific strength and specific rigidity than aluminum. They are higher in moldability (less blisters, etc.) than conventional molded plates of a sandwich structure. They are useful for applications where a plate thickness of 2 mm or less is needed.

What is claimed is:

1. A sheet molding compound comprising:
   a type A layer, which is a layer composed of a fiber reinforcement and a thermosetting resin containing hollow, light weight filler particles, and
   a type B layer, which is a layer composed of a fiber reinforcement and a thermosetting resin not containing hollow, light weight filler particles;
   wherein said sheet molding compound has a single consistently integrated structure, said single consistently integrated structure obtained by bringing said type A layer and said type B layer together, and thickening both layers simultaneously.

2. A sheet molding compound as claimed in claim 1, wherein said fiber reinforcement in said type A layer is glass fibers.

3. A sheet molding compound as claimed in claim 1, wherein said fiber reinforcement in said type B layer is glass fibers.

4. A sheet molding compound as claimed in claim 1, wherein said hollow, lightweight filler particles are resistant to a pressure of 100 kg/cm$^2$.

5. A sheet molding compound as claimed in claim 1, wherein said type A layer contains a thickening agent.

6. A sheet molding compound as claimed in claim 1, wherein said type B layer contains a thickening agent.

7. A sheet molding compound as claimed in claim 1, wherein the content of said fiber reinforcement is no less than 30% by volume.

8. A sheet molding compound as claimed in claim 1, wherein the content of said fiber reinforcement is in a range between 35 and 55% by volume.

9. A sheet molding compound obtained by;
   a) forming a type A layer, which is a layer composed of a fiber reinforcement and a thermosetting resin containing hollow, lightweight filler particles, on a surface of a thermoplastic film;

b) forming a type B layer, which is a layer composed of a fiber reinforcement and a thermosetting resin not containing hollow, lightweight filler particles, on a surface of another thermoplastic film;

c) joining the surfaces of said type A and type B layers to form a single consistently integrated sheet; and d) thickening said thermosetting resins simultaneously;

wherein said sheet molding compound is capable of being press-molded.

* * * * *